(12) United States Patent
Smith (10) Patent No.: US 9,121,785 B2
(45) Date of Patent: Sep. 1, 2015

(54) NON-POWERED IMPACT RECORDER

(75) Inventor: Fraser M. Smith, Salt Lake City, UT (US)

(73) Assignee: Sarcos LC, Salt Lake City, UT (US)

( * ) Notice: Subject to any disclaimer, the term of this patent is extended or adjusted under 35 U.S.C. 154(b) by 421 days.

(21) Appl. No.: 13/454,917

(22) Filed: Apr. 24, 2012

(65) Prior Publication Data

US 2013/0276538 A1 Oct. 24, 2013

(51) Int. Cl.
*G01H 13/00* (2006.01)
*G01M 7/08* (2006.01)
*G01L 1/06* (2006.01)
*G01L 1/18* (2006.01)
*G01L 5/00* (2006.01)
*A42B 3/04* (2006.01)

(52) U.S. Cl.
CPC .. *G01M 7/08* (2013.01); *G01L 1/06* (2013.01); *G01L 1/183* (2013.01); *G01L 5/0052* (2013.01); *A42B 3/046* (2013.01)

(58) Field of Classification Search
CPC ............................ A42B 3/046; G01P 15/0891
See application file for complete search history.

(56) References Cited

U.S. PATENT DOCUMENTS

| | | | |
|---|---|---|---|
| 4,507,705 A | 3/1985 | Hoshino et al. | |
| 5,001,933 A | 3/1991 | Brand | |
| 5,151,763 A | 9/1992 | Marek et al. | |
| 5,281,780 A | 1/1994 | Haland | |
| 5,390,367 A | 2/1995 | Rush, III | |
| 5,396,798 A | 3/1995 | Frische | |
| 5,408,214 A | 4/1995 | Chalmers | |
| 5,460,044 A * | 10/1995 | Yamamoto | 73/514.16 |
| 5,499,541 A | 3/1996 | Hopf et al. | |
| 5,539,935 A | 7/1996 | Rush, III | |
| 5,847,643 A | 12/1998 | Keith | |
| 5,874,675 A | 2/1999 | Edmans et al. | |
| 5,916,181 A | 6/1999 | Socci et al. | |
| 5,948,981 A | 9/1999 | Woodruff | |
| 5,978,972 A | 11/1999 | Stewart et al. | |
| 6,031,317 A | 2/2000 | Chen | |

(Continued)

FOREIGN PATENT DOCUMENTS

| DE | 3703946 | 8/1988 |
|---|---|---|
| WO | WO 2005/034666 A1 | 4/2005 |

(Continued)

OTHER PUBLICATIONS

Miles; "New Helmet Sensors to Measure Blast Impact"; American Forces Press Service, Jan. 7, 2008, 5 pages.

(Continued)

*Primary Examiner* — Hezron E Williams
*Assistant Examiner* — Mark A Shabman (57) ABSTRACT

A non-powered impact recorder is disclosed. The non-powered impact recorder includes a resonator tuned for a resonant response within a predetermined frequency range. A reduced cross-sectional area portion is formed within the resonator and configured to structurally fail when the resonator experiences the resonant response. Additionally, the non-powered impact recorder includes an electric circuit element disposed about the reduced cross-sectional area portion of the resonator. Upon structural failure of the resonator, the electric circuit element is broken to cause a discontinuity in the electric circuit element. Interrogation of the discontinuous electric circuit element facilitates approximation of impact frequency and/or impact energy.

25 Claims, 4 Drawing Sheets

(56) References Cited

U.S. PATENT DOCUMENTS

| | | |
|---|---|---|
| 6,301,718 B1 | 10/2001 | Rigal |
| 6,327,909 B1 | 12/2001 | Hung et al. |
| 6,549,872 B2 | 4/2003 | Bollweg et al. |
| 6,619,123 B2 | 9/2003 | Glanchandani et al. |
| 6,737,979 B1 | 5/2004 | Smith et al. |
| 6,826,509 B2 | 11/2004 | Crisco, III et al. |
| 6,858,970 B2 | 2/2005 | Malkin et al. |
| 7,032,454 B2 | 4/2006 | Amano |
| 7,162,392 B2 | 1/2007 | Vock et al. |
| 7,253,488 B2 | 8/2007 | Zhan et al. |
| 7,266,988 B2 | 9/2007 | Kranz et al. |
| 7,290,437 B1 | 11/2007 | Tanaka et al. |
| 7,660,692 B2 | 2/2010 | Van Albert et al. |
| 8,056,391 B2 | 11/2011 | Petelenz |
| 8,191,421 B2 | 6/2012 | Petelenz et al. |
| 2002/0070635 A1 | 6/2002 | Morrison et al. |
| 2003/0197448 A1 | 10/2003 | Tanielian |
| 2005/0177929 A1 | 8/2005 | Greenwald et al. |
| 2006/0038694 A1 | 2/2006 | Naunheim et al. |
| 2006/0074338 A1 | 4/2006 | Greenwald et al. |
| 2007/0056081 A1 | 3/2007 | Aspray |
| 2007/0089480 A1 | 4/2007 | Beck |
| 2007/0169553 A1 | 7/2007 | Mutharasan et al. |
| 2008/0083054 A1 | 4/2008 | Vaccari et al. |
| 2010/0326192 A1* | 12/2010 | Petelenz et al. .......... 73/579 |

FOREIGN PATENT DOCUMENTS

| | | |
|---|---|---|
| WO | WO 2006/085935 A2 | 8/2006 |
| WO | WO 2012/048237 | 4/2012 |

OTHER PUBLICATIONS

Buxbaum; "Government Healthit" "Pentagos testing helmet-mounted trauma sensor"; Published Apr. 10, 2008; www.govhealthit.com/online/news/350303-1.html, 2 pages.

www.ohsonline.com/articles/57407, Emergency Response; Helmet Sensors of Deployed Soldiers to Measure Impact Data:; Jan. 15, 2008, 2 pages.

www.shok-spotr.com/index.asp; "Shok SpotR, The First Helmet Sensor"; accessed Jul. 29, 2008, 2 pages.

www.riddell1.com/newsite/product_info.php?Path=104_76_. . . :Riddle Product Detail, accessed Jul. 29, 2008, 1 page.

www.smalltimes.com/article_display.cfm?Secion=A, Small times—Small tech tackles concussion syndrome with MEMS . . . Jan. 13, 2004, 5 pages.

IU Home Pages: Jan. 26, 2007—Faculty and staff news from the campuses of Indiana University, IU Home pages, "Football's a head game"; Jan. 26, 2007, 4 pages.

Greenwald, et al.; "Head Impact Telemetry System (HITS) for Measurement of Head Acceleration in the field"; no date is available but this piece should be considered as prior art for this matter.

U.S. Appl. No. 13/446,553, filed Apr. 13, 2012, Fraser M. Smith.

PCT/US2013/038041; filed Apr. 24, 2013; Raytheon Company; international search report dated Aug. 30, 2013.

\* cited by examiner

NON-POWERED IMPACT RECORDER

BACKGROUND

Humans engage in many activities that can subject them to dangerous impacts or shocks. For example, individuals such as soldiers, athletes, and motorsport participants that engage in dangerous activities have enhanced risk of injury due to impacts or shocks. To improve medical care following an impact, such individuals may be monitored to determine the severity or magnitude of the impact. Typical impact recorders provide large amounts of data that are difficult to process, are relatively bulky, and require power to be operational.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Efforts aimed at improving and miniaturizing typical impact recorders are underway. However, despite advances in sensors, metrological methods, digital signal processing (DSP) algorithms, and power efficiency of electronic components, traditional measurement techniques have limitations when detecting occasional, short-duration (micro-millisecond-duration), randomly occurring, and sparsely spaced phenomena, such as a blast or penetrating impact of a bullet. These limitations include, but are not limited to: (i) continuous power drain resulting from continuous monitoring, signal acquisition and signal/data processing (system "always on"); (ii) the need for using extremely fast, event-specific triggers (in order to avoid continuous power draw); (iii) relatively complex electronic measuring circuitry, with its associated weight, volume, batteries, protective casing (against water, temperature, mechanical damage, etc.); and (iv) cost, especially if multiple sensors are needed.

An impact detection system, comprising an impact recorder, is disclosed that can be configured to operate on little or no power to sense and record an impact. The non-powered impact recorder can be fabricated on a micro-scale or a nano-scale, and the simplicity of the non-powered impact recorder and ease of fabrication can provide a relatively low-cost impact recorder. In one exemplary embodiment, the non-powered impact recorder can comprise a resonator tuned for a resonant response within a predetermined frequency range. The impact recorder can also include a reduced cross-sectional area portion formed within the resonator configured to structurally fail when the resonator experiences the resonant response. Additionally, the impact recorder can include an electric circuit element disposed about the reduced cross-sectional area portion of the resonator. Upon structural failure of the resonator, the electric circuit element can be broken to cause a discontinuity in the electric circuit element. Interrogation of the discontinuous electric circuit element facilitates approximation of at least one of an impact frequency and an impact energy.

In one exemplary embodiment, an impact recorder and retrieval system (as part of an exemplary impact detection system) is disclosed. The impact detection system can include an interrogator and a non-powered impact recorder. The non-powered impact recorder can include a plurality of resonators, wherein at least one or more of the resonators are tuned for a resonant response within a different predetermined frequency range. The impact recorder can also include a reduced cross-sectional area portion formed within each resonator, configured to structurally fail when the resonator experiences the resonant response at a predetermined magnitude. In addition, the impact recorder can include an electric circuit element disposed about the reduced cross-sectional area portion of each resonator. Upon structural failure of the resonator, the electric circuit element can be broken to cause a discontinuity in the electric circuit element. Interrogation of the discontinuous electric circuit element by the interrogator facilitates approximation of at least one of an impact frequency and an impact energy.

A method for facilitating non-powered recording of an impact event is also disclosed. The method comprises providing a resonator tuned for a resonant response within a predetermined frequency range. The method also comprises facilitating structural failure of the resonator when the resonator experiences the resonant response. The method further comprises facilitating a discontinuity in an electric circuit element due to the structural failure of the resonator. Additionally, the method comprises facilitating interrogation of the electric circuit element to approximate at least one of an impact frequency and an impact energy.

Figure 1:
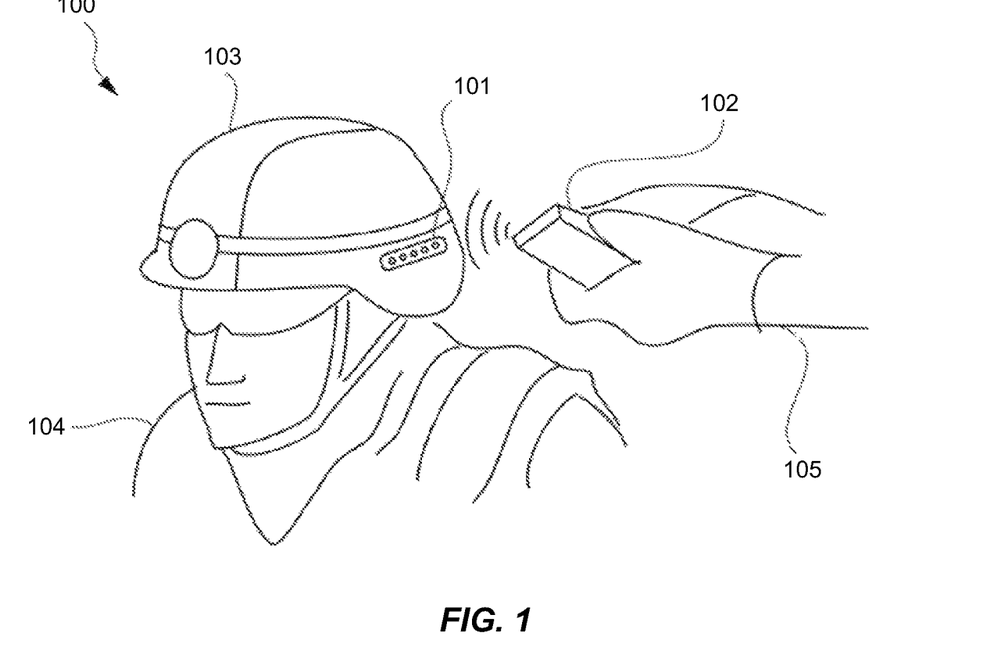
FIG. 1 illustrates an impact recorder and retrieval system, in accordance with an embodiment of the present invention.

One embodiment of an impact recorder and retrieval system 100 is illustrated in FIG. 1. The system 100 can comprise a non-powered impact recorder 101 and an interrogator 102. In this embodiment, the impact recorder 101 can be mounted on a helmet 103 of a person 104 and the results can be read using the interrogator 102. The impact recorder 101 can be capable of recording the maximum frequency and/or energy of a shock or impact to the head for aiding in the triage and diagnosis of a Traumatic Brain Injury (TBI).

After suffering an injury caused by the shock or impact, a wounded person may be unconscious or otherwise unable to accurately communicate the extent of his injuries to medical personnel. With the present invention, a medic 105 can use the interrogator 102 to approximate the maximum shock captured by the recorder 101 and assess the likelihood of TBI or other internal injuries not visible to the naked eye. With this information in hand, the medic can then perform triage and initiate an early treatment more suited to the specific injuries suffered by the wounded person, and possibly prevent the onset of delayed neurological damage resulting from head trauma that could otherwise go undetected.

One specific application of the system 100 can be in a battlefield environment. For example, a combat soldier can wear the helmet 103, to which is attached an impact recorder 101 that can record the maximum frequency and/or magnitude of a shock or impact experienced by the head of the soldier in response to a projectile or ballistic impact, or a shock wave from a nearby explosion. Applications can also extend to any product or device that receives an impact, such as football helmets, motorcycle helmets, bicycle helmets, body armor, protective pads, etc. Indeed, those skilled in the art will recognize the several possible applications in which the technology discussed herein may be incorporated.

For the purposes of the present disclosure, the terms "impact(s)" and "impact event(s)" refer generally to impacts and shock waves, unless context clearly dictates otherwise.

Figure 2:
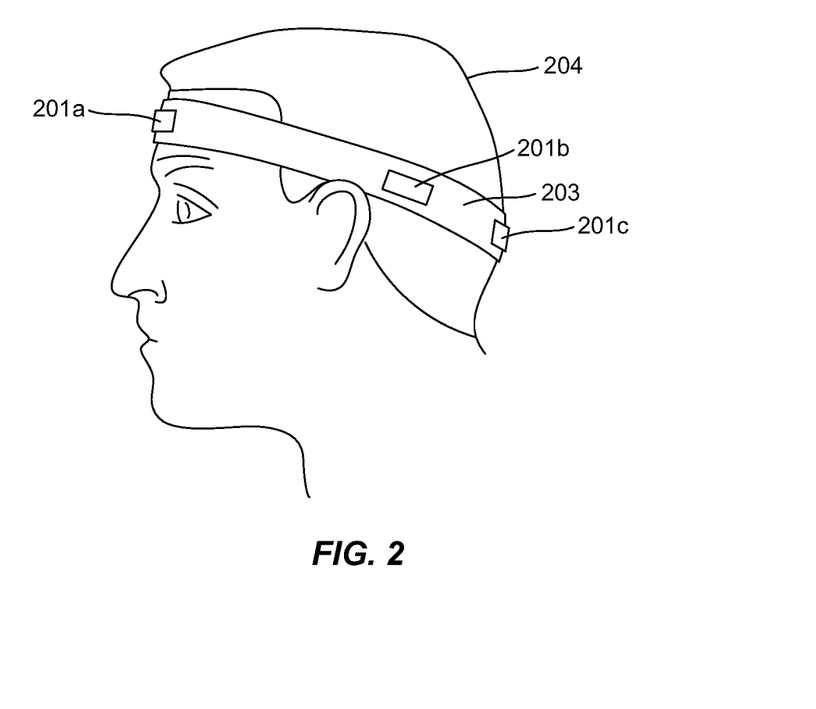
FIG. 2 illustrates multiple non-powered impact recorders disposed on a headband, in accordance with an embodiment of the present invention.

As can be appreciated, multiple impact recorders can be worn on the outside of a helmet, on the inside webbing, or on a headband or covering placed in direct contact with the head of the person. For example, FIG. 2 illustrates a headband 203 with multiple impact recorders 201a, 201b, 201c configured for close-coupling to the head of a person 204, thereby providing information directly related to the head's exposure to impact and/or shock. In other aspects of the invention, impact recorders can also be integrated into armor or sewn into a garment worn by a person to record the severity of injuries caused by impacts to other parts of the body. It is further noted that one or more impact recorders may be positioned about other parts of the body other than the head. As such, the exemplary embodiments discussed herein, and illustrated in the drawings, are not meant to be limiting in any way.

Figure 3:
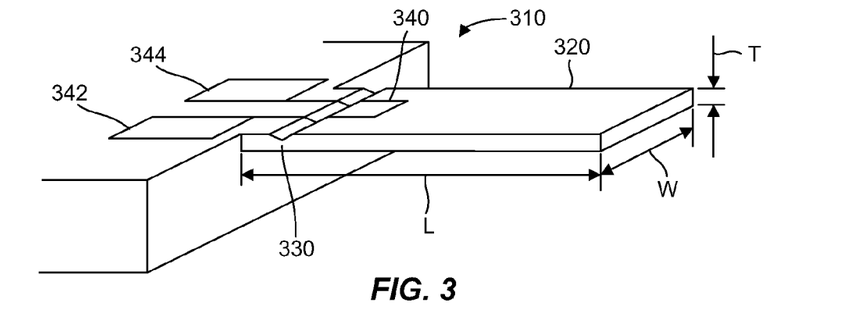
FIG. 3 illustrates a non-powered impact recorder, in accordance with an embodiment of the present invention.

With reference to FIG. 3, illustrated is a non-powered impact recorder 310 in accordance with one exemplary embodiment. The impact recorder 310 can include a resonator 320 tuned for a resonant response within a predetermined frequency range. A reduced cross-sectional area portion 330 can be formed within the resonator 320. The reduced cross-sectional area portion 330 can be configured to structurally fail when the resonator 320 experiences resonant response, such as from an impact or shock. In one aspect, the reduced cross-sectional area portion 330 can be configured to structurally fail at a predetermined magnitude of the resonant response. An electric circuit element 340 can be disposed over or about the reduced cross-sectional area portion 330 of the resonator 320. Upon structural failure of the resonator 320 at the reduced cross-sectional area portion 330, the electric circuit element 340 can be caused to be broken as a result in order to cause a discontinuity in the electric circuit element 340. Thus, in one aspect, the electric circuit element 340 can be used to determine whether the resonator 320 experienced a resonant response of a given magnitude sufficient to break the resonator 320 (and the electric circuit element 340) at the reduced cross-sectional area portion 330. Together, the resonator 320 and the electric circuit element 340 can therefore function as an electro-mechanical fuse. If broken, the electric circuit element 340 will register a discontinuity upon interrogation, indicating that a frequency within a predetermined range at a predetermined magnitude was experienced by the impact recorder 310. In this way, interrogation of a discontinuous electric circuit element can facilitate approximation of an impact frequency and/or impact energy experienced by the impact recorder.

In one aspect, the resonator 320 can include a cantilever beam. The resonator 320 can be made from a rigid material having a pre-determined density and Young's Modulus of Elasticity, as well as a pre-determined length (L), width (W) and thickness (T). Through appropriate selection of the rigid material and dimensions, the cantilever beam can be "tuned" with a particular natural frequency. Any beam shape is contemplated, such as a beam with a round, triangular, "I-shaped", and/or "T-shaped" cross-sections.

To facilitate structural failure of the resonator 320, the reduced cross-sectional area portion 330 can be configured to break when the resonator 320 experiences a resonant response of a given magnitude. The magnitude can represent a given energy level or range experienced by the resonator 320 at the tuned resonant frequency range. In one aspect, the reduced cross-sectional area portion 330 can be formed, at least in part, by a groove, notch, or other stress concentrating feature in the resonator 320.

The electric circuit element 340 can comprise a conductive trace or other conductive element suitable to facilitate breakage of the electric circuit element 340 upon structural failure of the resonator 320 at the reduced cross-sectional area portion 330. A conductive trace or element can include any type or form of conductive trace or element. For example, a conductive trace and a resonator can be fabricated using a combination of thin film deposition process steps and semiconductor manufacturing techniques. Thus, in one aspect, the impact recorder 310 can be fabricated on a micro-scale or a nano-scale. In another aspect, the simplicity of the impact recorder 310 and ease of fabrication can provide a relatively low-cost impact recorder.

In one aspect, a conductive trace can comprise a conductive path, made of copper or some other conductive material, on top of or embedded in a surface of a resonator 320. For example, one technique for forming a conductive trace can include copper clad laminates. This technique can utilize electro deposition, where the resonator 320 surface can be coated with copper and then a conductive trace can be created by etching unwanted areas away.

In another aspect, a conductive trace can be formed by wet deposition and/or vacuum techniques, such as electro deposition, evaporation, sputtering, printing, spraying, and coating. Some of these techniques are additive processes where only the traces are created, and some techniques are subtractive where the whole surface is coated with a conductive layer and the traces are formed by removing the unwanted area. The evaporation and sputtering techniques can use wide range of materials like small molecules, bulk metals, and indium tin oxide (ITO). These materials can be atomized, for example, by heat or electron bombardment and the atoms can be directed to the resonator 320 surface to create a conductive layer. Masks can be used for patterning a conductive trace, or the resonator surface can be coated and a conductive trace can be made with subtractive techniques, for example, by etching.

Conductive inks are typically in a solution/wet form and usually contain the conductive part (molecule or particle), solvent, binder, and additives. The main benefit is that they can be printed, coated, and sprayed with relatively simple techniques. Conductive inks can include nanometer or micrometer size conductive particles or solutions having conductive polymers or metallo-organic precursors.

In one embodiment, the impact recorder 310 can also include terminals 342, 344 electrically coupled to opposite ends of the electric circuit element 340 to electrically couple with leads from an interrogator. The terminals 342, 344 can facilitate ease of a continuity check or other interrogation to determine whether the electrical circuit element has been broken. For example, the terminals 342, 344 can provide an exposed surface configured to allow manual manipulation of leads or probes from an interrogator into electrical contact with the terminals 342, 344 to perform a continuity check of the electric circuit element 340.

The non-powered impact recorder 310 can thus utilize mechanical fracture and conducting traces for event detection and data storage. The tuned resonator 320 can be sized to fracture or break when subjected to an impact or shockwave overpressure above a preset excitation level in a frequency band, thereby allowing permanent data storage without electrical power. In one aspect, the data can be read by measuring the electrical continuity of the electrical element, such as a thin film conducting trace deposited on a cantilever beam. In another aspect, the data can be read by visual inspection of the resonator and/or the electrical element to determine whether structural failure has occurred.

Advantageously, as can be appreciated, because the impact recorder 310 does not require power, no power is used while waiting for a blast or impact to occur, no power is required for data storage, and there is no need for maintenance, such as battery replacement, hardware or software maintenance, or system calibration.

Figure 4:
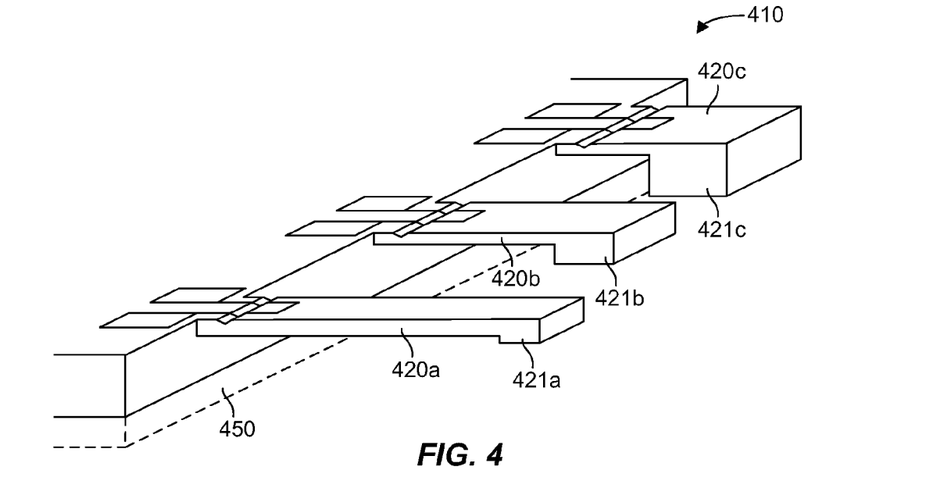
FIG. 4 illustrates a non-powered impact recorder, in accordance with another embodiment of the present invention.

With reference to FIG. 4, illustrated is an exemplary non-powered impact recorder 410 having a plurality of resonators 420a, 420b, 420c, each one tuned to comprise a different resonant response within respective predetermined frequency ranges. In one aspect, the plurality of resonators can be configured as an array of resonators. In this embodiment, the resonators 420a, 420b, 420c are configured as cantilever beams of different proportions. For example, length, width, and/or thickness can vary among the different resonators. Additionally, the resonators 420a, 420b, 420c can include additional mass portions 421a, 421b, 421c, respectively, located at free ends of the cantilever beams that can be sized and configured to tune the resonators for a resonant response over a desired resonant frequency range. In one aspect, material composition can vary among the resonators. Thus, the resonators can differ from one another in length, width, thickness, and/or material to tune the resonators to a resonant response within a given frequency range, which may be the same or a different frequency range relative to another resonator. Moreover, structural failure of a resonator at a given amplitude can be obtained by altering any relevant aspect of the geometry, such as thickness, length, and/or width, and/or material composition, as well.

Figure 5:
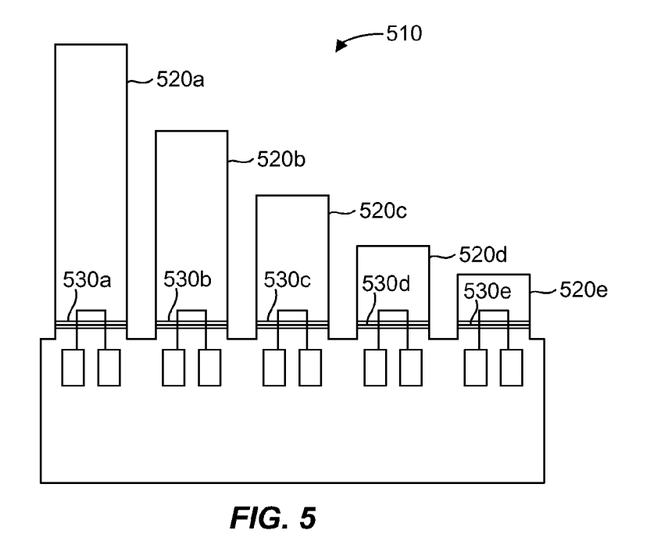
FIG. 5 illustrates a non-powered impact recorder, in accordance with yet another embodiment of the present invention.

With reference to FIG. 5, a top view of an exemplary non-powered impact recorder 510 is illustrated that includes a plurality of resonators 520a, 520b, 520c, 520d, 520e. In one aspect, at least two resonators can be tuned for a resonant response within a different predetermined frequency range. For example, as shown in the figure, each of the resonators 520a, 520b, 520c, 520d, 520e has a different length and may therefore be tuned for resonant responses within different predetermined frequency ranges from one another. As shown in the figure, the resonators 520a, 520b, 520c, 520d, and 520e can be configured as an array of cantilever beams of ascending length. Additionally, reduced cross-sectional area portions (e.g., grooves formed within the beams) 530a, 530b, 530c, 530d, and 530e formed within each resonator 520a, 520b, 520c, 520d, and 520e, respectively, and can be configured to structurally fail when the resonator experiences the resonant response, such as at an excitation above a predetermined threshold. Thus, for each frequency range, the amplitude and/or energy of an impact event can be approximated based on whether a given resonator broke or failed due to the impact event.

Each resonator can be configured with a geometry to achieve the desired response (i.e., sensitivity and/or frequency selectivity). For a given material, the length, width, and thickness of each resonator can be determined in order to obtain the desired response. The length, width, depth, and/or location of the stress concentration notch can also be determined to provide a reduced cross-sectional area portion of each resonator. Based on the configuration of the resonators, the shape and magnitude of resonator deflection for both the principal and harmonic frequencies can be predicted. Additionally, the response of each resonator to impulse input, as well as to excitation using actual experimental data, can be predicted. In one aspect, the resonators can be designed to provide mode separation and damping so that each beam will respond mostly in its first vibration mode. More specifically, resonators can be designed to maximize the first mode and to minimize the contribution from higher modes.

In another aspect, a plurality of non-powered impact recorders, similar to impact recorder 510, can be employed to refine approximations of the amplitude and/or energy of an impact event. For example, each of the plurality of impact recorders can be similar to one another with regard to the number of resonators and associated resonant frequencies. Where the impact recorders can differ, however, is in the excitation level at which the resonators are configured to break. In one instance, the reduced cross-sectional area portions can be configured to provide different stress concentration factors that can cause the resonators to break at different amplitude and/or energy levels. For example, the stress concentration notches or grooves in the resonators can have different depths, which can be calibrated to cause the resonators to fail at different amplitudes and/or energy levels. By determining which resonators broke due to an impact event, a spectral density diagram can be created that approximates the energy of the impact for each frequency range. Thus, arrays of resonators can be used to analyze the spectral signature of impact or blast events. In one aspect, the frequency response of each resonator can be tuned to maximize the signal over a narrow bandwidth, allowing the impact recorder to perform a function akin to that of a spectrum analyzer, as discussed further hereinafter. In another aspect, two or more non-powered impact recorders can be orientated along orthogonal axes for measurement of an impact in at least two dimensions.

The resonators can be configured to deflect in response to an impact wave traveling through a human body or to a shockwave resulting from an event, such as an explosion. Since different measurements can be used to detect a blast pressure wave and a projectile impact, different configurations of non-powered impact recorders can be employed, based on the non-powered impact recorders discussed herein. Thus, in one aspect, a non-powered impact recorder can be configured as an impact sensor or as a blast sensor. For an impact sensor, the responses of the resonators can be tuned to the centers of frequency ranges that cover the expected power content of an impact. For a blast sensor, the responses of the resonators can be tuned to selected pressure ranges that cover the expected pressure content of a blast.

For projectile impact detection and recording, a non-powered impact recorder can be configured as an impact sensor to respond to the magnitude and frequency of a shockwave caused by an impact and traveling throughout the body or body armor. The impact sensor can be, in a sense, a mechanical vibration spectrometer that can include a predetermined number of resonators, which can measure the frequency signature of the shockwave by registering the maximum energy of the wave in discrete predetermined frequency ranges. The impact sensor can passively record the event through the loss of electrical continuity in an electrical circuit element patterned on an array of resonators. Such devices can enable the determination of a spectral distribution (signature) of shockwave energy associated with ballistic events, permitting the classification of each event's characteristic frequency/amplitude signature, without continuous signal digitization or a power-intensive DSP.

Each beam can be optimized for a resonant response to vibrations within a specific frequency range with a bandwidth corresponding to the selected sensor frequency resolution, i.e., 1, 2 or 4 kHz. Frequency bands may be designed to detect or reject specific frequencies and may not be equidistant or of equal bandwidth. The characteristic frequency distribution of the original signal can be determined without resorting to power-intensive continuous high rate sampling, an analog to digital converter, or complex pattern analysis algorithms. For integration on a helmet or a headband, the impact sensor can be tailored to respond to impact levels ranging from several Gs to several hundred Gs, and can cover the range of frequencies between >1 kHz up to approximately 15 kHz.

For blast magnitude detection and recording, a non-powered impact recorder can be configured as a blast sensor that will respond to the maximum amplitude of a blast pressure wave. Similar to the impact sensor, the blast sensor can include a plurality of resonators. The blast sensor, however, can be mounted on a pressure sensing diaphragm 450, as shown in FIG. 4. The blast sensor can be configured to detect energy content and maxima of the blast pressure wave experienced by the body, over preselected frequency windows. This information can allow medical personnel to determine potential latent brain or organ damage that may result from blast exposure and that may include mTBI, lung, or other internal organ(s) injury, or possibly a delayed-onset PTSD related to central nervous system injury.

In one aspect, the blast sensor can be configured for pressures within the range of 1-25 psi, in approximately 5 sub ranges. Exposure to overpressure within this range is known to result in mTBI and may have devastating long-term effects. Exposure to a high-pressure blast, with pressures exceeding 15 psi and more particularly, 20-25 psi, usually results in other injuries that are immediately obvious and require medical treatment, which often includes neurological examination for possible TBI and other neurological damage. The positive overpressure range of the proposed sensor can therefore be limited to 25 psi for this application, with an indicator of over-threshold values in the 25 to 100 psi range.

One difference in configuration between an impact sensor and a blast sensor can be in the geometry of the resonators. The impact sensor resonators can differ in length and/or width dimensions, but not in thickness. On the other hand, the blast sensor resonators can be of similar length and/or width dimensions while differing in thickness, in addition to being mounted on a pressure sensing diaphragm. Thus, a non-powered impact recorder can be configured with resonators that are sensitive to vibrations in several selected, discrete frequency ranges (impact sensor), or that respond within well-defined discrete pressure ranges (blast sensor). By recording the maximum vibration energy in each of the pre-determined frequency ranges, the energy spectrum of characteristic "signatures" of the shockwave resulting from a blast or a ballistic impact event and traveling through the impacted material or the body tissues can be estimated. This information can be permanently stored and encoded as fractured resonators and non-conductivity of associated electric circuit elements.

Figure 6:
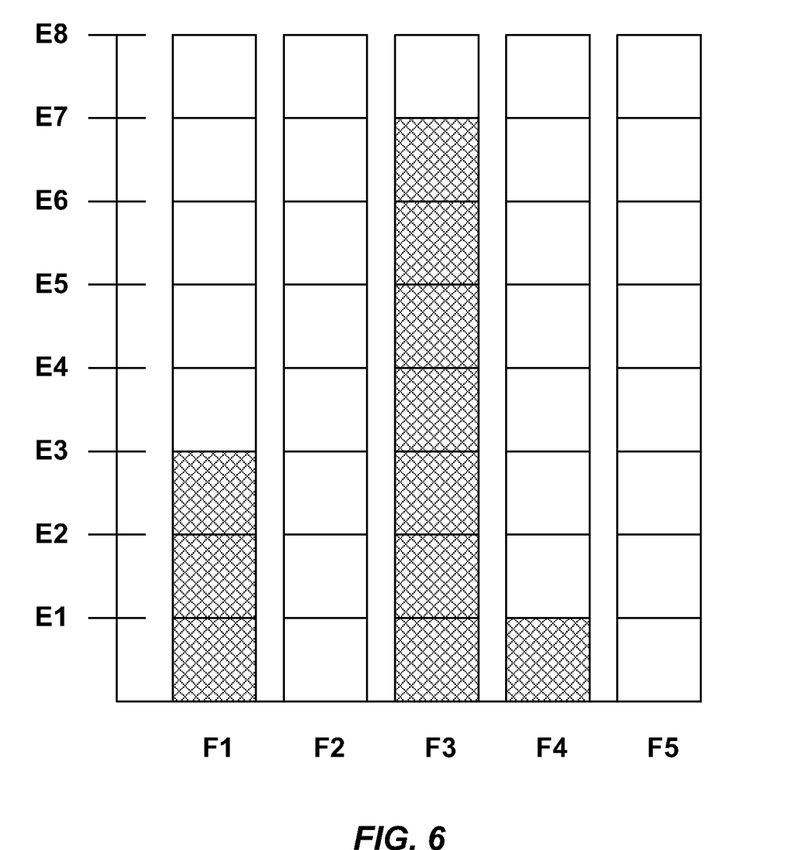
FIG. 6 is an example energy spectral density diagram generated by a plurality of resonators.

As illustrated in FIG. 6, an energy spectral density diagram can describe how the energy of an impact or blast is distributed with frequency. E1 through E8 represent eight energy thresholds associated with eight different impact recorders. F1 through F5 represent five discrete frequency ranges associated with the resonant frequencies of five resonators of a given impact recorder. In the diagram, the resonators tuned to break at or below energy level E3 in frequency range F1 were broken as a result of an impact event. Thus, the energy level of the impact for frequency range F1 can be approximated as greater than E3 and less than E4. No resonators were broken in frequency range F2, therefore, the energy level of the impact at frequency range F2 can be approximated as less than E1. Since no resonators were broken in frequency range F5, the approximated energy level is also less than E1. The resonators tuned to break at or below energy level E7 in frequency range F3 were broken as a result of the impact. Thus, the energy level of the impact for frequency range F3 can be approximated as greater than E7 and less than E8. The resonator tuned to break at energy level E1 in frequency range F4 was broken as a result of the impact. Thus, the energy level of the impact for frequency range F4 can be approximated as greater than E1 and less than E2. In this way, the non-powered impact recorders can be used to perform a frequency domain spectral analysis of an impact event. It should be recognized that the impact recorders can be configured to record data for any number of frequency ranges and can be used to approximate any energy level range according to the desired resolution of the results.

In one aspect, a non-powered impact recorder can be part of an impact and/or blast spectrum analyzer. More particularly, multiple arrays of resonators can be used to characterize events of different amplitude and frequency spectral signature. Information about a recorded event can be permanently stored, without need for external electrical power, and can be detected by monitoring the electrical continuity of a conducting trace deposited on each resonator. Electrical power can be provided by an interrogator and/or associated components.

Figure 7:
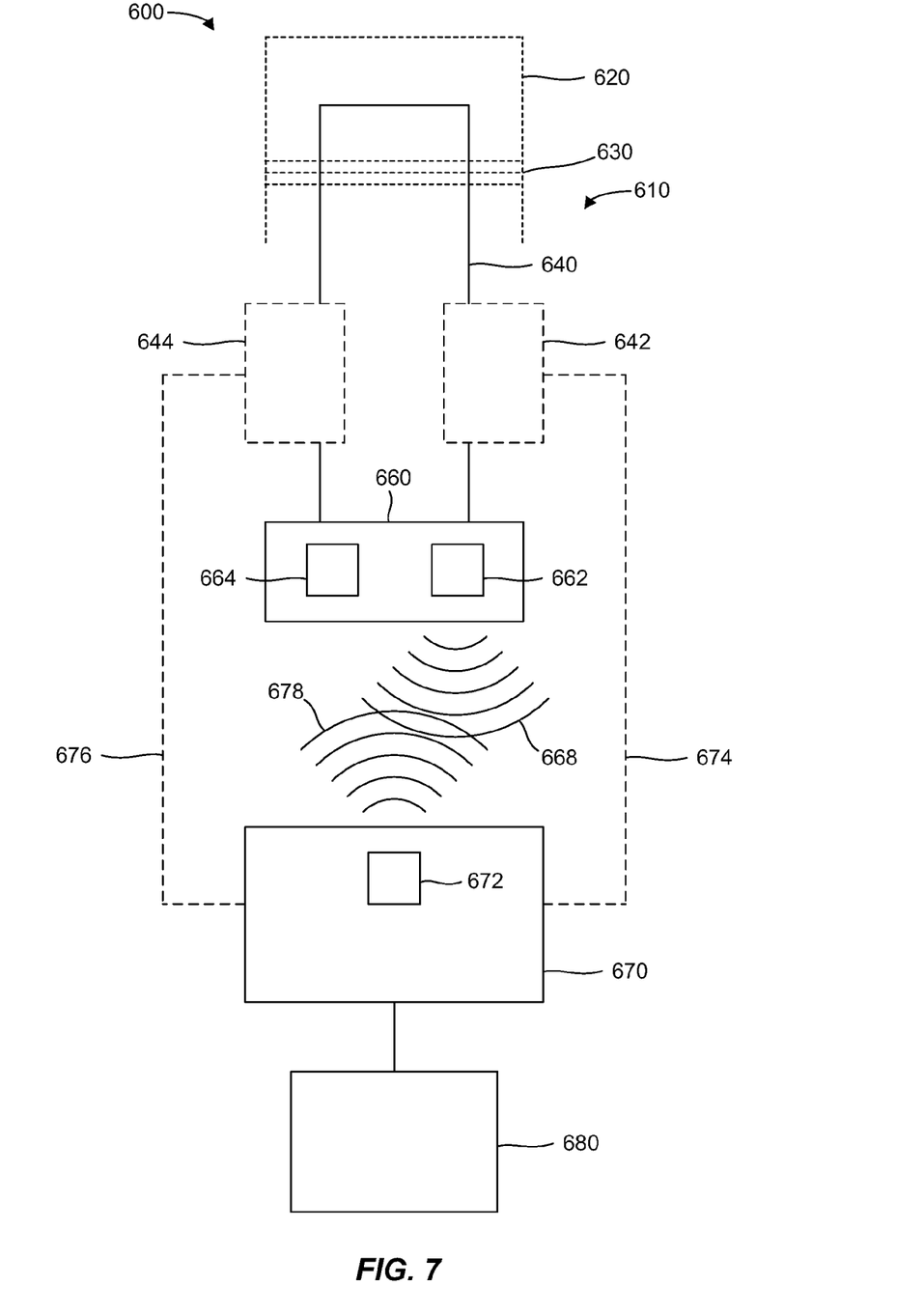
FIG. 7 is a schematic representation of an impact recorder and retrieval system, in accordance with an embodiment of the present invention.

With reference to FIG. 7, a schematic diagram of an impact recorder and retrieval system 600 is illustrated. The system 600 can include non-powered impact recorder 610 having a resonator 620, a reduced cross-sectional area portion 630, and an electric circuit element 640, such as those described above. In addition, the system 600 can include an interrogator 670. Interrogation of a discontinuous electric circuit element by the interrogator 670 can facilitate approximation of an impact frequency and/or an impact energy. The system 600 can also include a database 680, which can be coupled to the interrogator 670, and can store an impact frequency failure threshold and/or an impact energy failure threshold for the resonator 620 or a plurality of resonators.

In one embodiment, leads 674, 676 from the interrogator 670 can electrically couple with terminals 642, 644, which can be electrically coupled to opposite ends of the electric circuit element 640. This can facilitate a continuity check to determine whether the electrical circuit element 640 has been broken. For example, the interrogator 670 can apply a voltage and/or a current to determine continuity of the electric circuit element 640.

In another embodiment, the interrogator 670 can include a transmitter and a receiver 672 to transmit a wireless signal 678 to determine continuity of the electric circuit element. In this case, the non-powered impact recorder 610 can include a passive radio frequency identification (RFID) tag 660 electrically coupled to the electric circuit element 640 to receive the wireless signal 678 from the interrogator 670 with a transmitter and receiver 662. The RFID tag 660 can be used to report continuity status of the electric circuit element following an impact event. For example, the RFID tag 660 can report on discontinuous and/or continuous electric circuit elements following an impact event. The RFID tag 660 can gather sufficient power from the incoming wireless signal 678 generated by the interrogator 670 to transmit a response signal 668 that conveys information to the interrogator 670.

The RFID tag 660 can also include a circuit component 664. In one aspect, the circuit component 664 can be configured such that a discontinuous electric circuit element 640 prevents the RFID tag 660 from responding to interrogation. Thus, by tallying responses from various RFID tags, a determination can be made as to which electric circuit elements are discontinuous and which electric circuit elements maintain continuity following an impact event. In another aspect, the circuit component 664 of the RFID tag 660 can be configured to respond to interrogation with a first response and/or a second response. For example, a continuous electric circuit element 640 can cause the first response and a discontinuous electric circuit element 640 can cause the second response. Thus, each RFID tag can affirmatively respond to interrogation whether the electric circuit element is continuous or discontinuous. This can remove speculation as to whether the RFID tag received the interrogation signal. In a specific embodiment, the interrogator 670 can also be configured to provide a visual display of the information gathered through interrogation and/or a spectrum diagram of the impact event.

In accordance with one embodiment of the present invention, a method for facilitating non-powered recording of an impact event is disclosed. The method can comprise providing a resonator tuned for a resonant response within a predetermined frequency range. The method can also comprise facilitating structural failure of the resonator when the resonator experiences the resonant response. The method can further comprise facilitating a discontinuity in an electric circuit element due to the structural failure of the resonator. Additionally, the method can comprise facilitating interrogation of the electric circuit element to approximate at least one of an impact frequency and an impact energy.

In one embodiment, facilitating structural failure of the resonator can comprise forming a reduced cross-sectional area portion within the resonator. In a specific embodiment, facilitating a discontinuity in an electric circuit element can comprise disposing the electric circuit element about the reduced cross-sectional area portion of the resonator. In one aspect, structural failure of the resonator can occur when the resonator experiences resonant response at a predetermined magnitude. In another aspect, the resonator comprises at least two resonators tuned for resonant responses within different predetermined frequency ranges. Furthermore, the resonator can comprise at least two resonators tuned for resonant responses within the same predetermined frequency range, and structural failure of the resonators can occur when the resonators experience resonant responses at different predetermined magnitudes.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A non-powered impact recorder, comprising:
a plurality of resonators, each resonator tuned for a resonant response within a predetermined frequency range,
a reduced cross-sectional area portion formed within each of the plurality of resonators, each resonator configured to structurally fail when the resonator experiences the resonant response at a predetermined amplitude, wherein at least two of the plurality of resonators are tuned for a resonant response within the same predetermined frequency range, the reduced cross-sectional area portions of each of the at least two resonators being configured to structurally fail at different amplitudes; and
an electric circuit element disposed about the reduced cross-sectional area portion of each resonator, wherein upon structural failure of the resonator, the electric circuit element is broken to cause a discontinuity in the electric circuit element, and wherein interrogation of the discontinuous electric circuit element facilitates approximation of at least one of an impact frequency and an impact energy.

2. The impact recorder of claim 1, wherein the reduced cross-sectional area portion is configured to structurally fail at a predetermined magnitude of the resonant response.

3. The impact recorder of claim 1, wherein the electric circuit element comprises a conductive trace.

4. The impact recorder of claim 1, further comprising terminals electrically coupled to opposite ends of the electric circuit element to electrically couple with leads from an interrogator.

5. The impact recorder of claim 1, further comprising a passive radio frequency identification (RFID) tag electrically coupled to the electric circuit element to receive a wireless signal from an interrogator.

6. The impact recorder of claim 5, wherein the discontinuous electric circuit element prevents the RFID tag from responding to interrogation.

7. The impact recorder of claim 5, wherein the RFID tag is configured to respond to interrogation with at least one of a first response and a second response, a continuous electric circuit element causing the first response and the discontinuous electric circuit element causing the second response.

8. The impact recorder of claim 5, wherein the RFID tag is configured to respond to interrogation with a continuity status of the electric circuit element.

9. The impact recorder of claim 1, wherein the at least one of the resonators is formed into a substrate.

10. The impact recorder of claim 1, wherein the at least one of the resonators comprises a cantilever beam.

11. The impact recorder of claim 1, wherein at least two of the plurality of resonators are tuned for resonant responses within different predetermined frequency ranges.

12. The impact recorder of claim 11, wherein at least some of the resonators differ from one another in at least one of length, width, thickness, and material.

13. The impact recorder of claim 1, wherein the at least two resonators differ from one another in at least one of length, width, thickness, and material.

14. The impact recorder of claim 1, wherein the plurality of resonators comprises an array of cantilever beams of ascending length.

15. The impact recorder of claim 1, further comprising a pressure-sensing diaphragm, wherein the impact recorder is configured as a blast sensor that detects energy content and maxima of a blast pressure wave experienced over preselected frequency windows.

16. An impact recorder and retrieval system, comprising:
an interrogator; and
a non-powered impact recorder having
a plurality of resonators, each resonator tuned for a resonant response within a predetermined frequency range,
a reduced cross-sectional area portion formed within each resonator, configured to structurally fail when the respective resonator experiences the resonant response at a predetermined magnitude, wherein at least two of the plurality of resonators are tuned for a resonant response within the same predetermined frequency range, the reduced cross-sectional area portions of each of the at least two resonators being configured to structurally fail at different amplitudes, and
an electric circuit element disposed about the reduced cross-sectional area portion of each resonator,
wherein upon structural failure of the resonator, the electric circuit element is broken to cause a discontinuity in the electric circuit element, and
wherein interrogation of the discontinuous electric circuit element by the interrogator facilitates approximation of at least one of an impact frequency and an impact energy.

17. The system of claim 16, further comprising a database having at least one of an impact frequency failure threshold and an impact energy failure threshold for each resonator.

18. The system of claim 16, wherein the interrogator applies at least one of a voltage and a current to determine continuity of one or more electric circuit elements.

19. The system of claim 16, wherein the interrogator transmits a wireless signal to determine continuity of one or more electric circuit elements.

20. A method for facilitating non-powered recording of an impact event, comprising:
providing a plurality of resonators, each resonator tuned for a resonant response within a predetermined frequency range;
facilitating structural failure of each resonator when the resonator experiences the resonant response, wherein at least two of the plurality of resonators are tuned for a resonant response within the same predetermined frequency range and are configured to structurally fail at different magnitudes;
facilitating a discontinuity in an electric circuit element due to the structural failure of the resonator; and
facilitating interrogation of the electric circuit element to approximate at least one of an impact frequency and an impact energy.

21. The method of claim 20, wherein facilitating structural failure of each resonator comprises forming a reduced cross-sectional area portion within each resonator.

22. The method of claim 21, wherein facilitating a discontinuity in an electric circuit element comprises disposing the electric circuit element about the reduced cross-sectional area portion of the resonator.

23. The method of claim 20, wherein structural failure of the resonator occurs when the resonator experiences resonant response at a predetermined magnitude.

24. The method of claim 20, wherein the resonator comprises at least two resonators tuned for resonant responses within different predetermined frequency ranges.

25. The system of claim 16, wherein at least two of the plurality of resonators are tuned for resonant responses within different predetermined frequency ranges.

* * * * *